Aug. 13, 1929. K. W. MILLER 1,724,298
SURFACE LAMP
Filed July 20, 1927

Witness:
William P. Kilroy

Inventor:
Kenneth Miller
By Brown Boueters-Dunds
Attys

Patented Aug. 13, 1929.

1,724,298

UNITED STATES PATENT OFFICE.

KENNETH W. MILLER, OF CHICAGO, ILLINOIS, ASSIGNOR OF ONE-HALF TO JOHN A. DIENNER, OF EVANSTON, ILLINOIS.

SURFACE LAMP.

Application filed July 20, 1927. Serial No. 207,144.

In the art of illumination it is frequently found desirable to have a diffuse supply of light over a considerable area to eliminate shadows and to prevent eye strain caused by concentrated light sources. This result is usually obtained by the use of concentrated light sources, such as the commercial tungsten lamps, together with an indirect lighting arrangement or by the use of translucent or "frosted" globes or bowls. Such applications are often combined with decorative effects sometimes involving the use of colors.

Although the light efficiency of the original source in such cases is the best at present commercially obtainable, still the energy efficiency of the ordinary present day sources is usually less than 2 per cent and a large fraction of even this amount is lost in the methods incidental to the production of the indirect or diffused illumination.

There is, then, a need for a direct light source which is itself of large area and low intensity such as the one described in this invention. Since the light source described in this invention may have the colors of the radiating surface varied over different areas, as afterward described in detail, then in addition to furnishing light, the lamp may be used as a self luminous painting or design suitable for wall or ceiling panels of rooms. Decorative effects of exquisite beauty may be attained which would make this surface lamp very useful even though its energy efficiency may be very low. However, since the lamp is a source of "cold light" (with all the advantages incident to lack of heat) and largely involves the principles underlying luminescence, fluorescence and phosphorescence, the possibilities of high efficiency are very great indeed.

Furthermore, as afterward described, the lamp has practically instantaneous light properties with the possibilities of uneven surface stimulation by outside illumination so that it can be used as a "responsive" receiving screen in motion pictures or even in television work. That is, by amplification of the incident light by power supplied locally to the device, it may relieve the projector of the burden of excessive intensity. When so used, the projected beam would merely act as the control or "trigger" which would cause the surface lamp or screen to radiate of itself light of greater intensity but proportional to the controlling beam.

A proper understanding of the essential features of my invention may be had by reference to the following specification and claims when taken in connection with the accompanying drawings which illustrate an embodiment of the invention.

In the drawings:—

Figure 3:
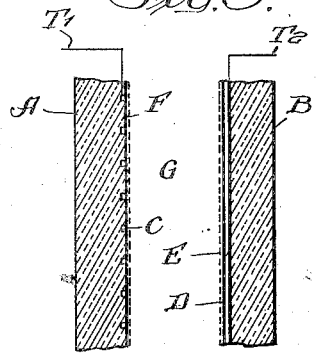
Fig. 3 is a fragmentary diagrammatic section of the same.
Figure 4:
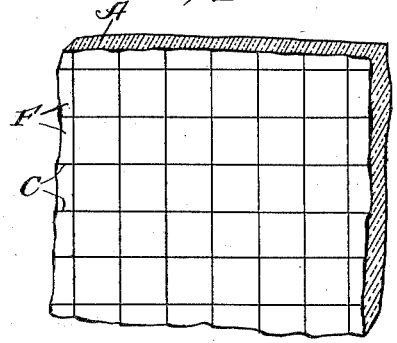
Fig. 4 is a fragmentary face view of the inside of one of the plates.

The surface lamp, of which Fig. 3 is a cross section, may be of any desired area or dimensions. It may consist of two parallel flat plates A and B supported a small distance apart and sealed around the edges H to be vacuum tight. Although for some applications both plates A and B may be transparent and optically active, Fig. 3 illustrates the simpler arrangement in which only the side A radiates light, but it is to be understood that the invention includes both cases.

Plate A must, then, be transparent to the rays which it is desired should enter or leave the lamp and may be of glass, fused quartz or other suitable material.

Plate B may be glass, fused quartz, or other transparent or opaque material. If B is non-conducting, it is covered on its inner surface with an electric conducting film D, of silver or other metal, and then on this is deposited a film E of the alkali metals, or other photo-electrically active material. In some applications the functions of films E and D may be combined with the omission of either, or plate B may be of metal and combined in function with E and D.

The object is to have an electrode which is of large area, which has proper mechanical and thermal properties to act as one wall of a vacuum tight vessel, which is electrically conducting, and which may have good light reflecting qualities as well as photoelectric properties.

The other electrode C may be a metal gauze or perforated metal sheet, but for some applications a much better "transparent" electrode can be prepared as follows: Cover the inside surface of plate A with a thin film of wax. Cross rule the wax into small squares (or decorative patterns) by scratching through the wax. Etch the plate with hydrofluoric acid (or other suitable chemical) to produce a pattern or grid of depressions in the plate. Then, without removing the wax, rinse off the acid and deposit a silver film over the entire surface. The wax must next be carefully removed by scraping or otherwise in such a manner as to leave a metal net or grid inlay in the etched depressions, with transparent areas or squares enclosed. Electrical conductivity of the grid may then be further increased if desired by electroplating a suitable metal reenforcement onto the grid. In some cases it may be desirable to compromise between electrical continuity and optical transparency by "half silvering" the areas in the grid by a very thin metal film.

If a wire gauze or perforated metal sheet is used for electrode C, then the open "windows" in the mesh or sheet should be filled in with a transparent film of material to support the optically active film F, or, in some cases, the film F itself can be used to fill in the windows in the wire gauze or metal sheet. If desired, as for the electrode already described, "half silvering" could be applied on this film.

In either case after a proper "transparent electrical net" has been prepared, it is to be covered with a film of material F which is as transparent as possible—at least translucent—and which has maximum luminescent, fluorescent, and phosphorescent properties—such materials, for example, as zinc sulphide, calcium sulphide, the platino-cyanides, etc. in a proper binding material. The object is to have a transparent electrode that will be caused to radiate light or to fluoresce under the action of electronic or ionic bombardment or by the action of short wavelength light which may be produced in the gas in the space G between the electrodes. The assortment of the materials used in the film F may be varied and also unevenly applied to obtain a variation of color and intensity for artistic effects. The properties of film E, and the material and coloring of plate A can also be varied to obtain additional color effects.

The space G between the electrodes is filled with a gas or vapor at low pressure. The gases and vapors used, single or in combination, can be varied in kind and pressure to obtain an optimum condition for the film materials and voltage used. Voltage is to be applied between the electrodes C and D as by the terminals $T_1$ and $T_2$. Ordinarily D would be the cathode with direct current, but with modifications alternating current could be used.

It is evident that the space G between electrodes is the original source of the radiant energy. It is here that electrical energy is consumed in ionizing the gas or in accelerating electrons and ions freed from the gas or evolved at the electrodes. The gas itself may be operated below or at its saturation current or in its range of ionization by collision. Ionization may be produced by the electrical voltage only, or in part by the electrons evolved at the electrodes, or by ultra violet light incident to the operation of the device. If desired the space can be highly evacuated and permit acceleration of electrons practically independent of the gas. The amount of electrical actions in a gas is proportional to the amount of gaseous material between the electrodes. With large area electrodes closely spaced, the gas pressures need not be excessively small, which is a very important practical advantage. By proper selection of materials and adjustment of pressure and voltage the characteristics of the lamp may be altered to be suitable for illumination or technical purposes.

When operating as a source of light the action would be as follows: Electrons or ions freed from the ionizing of the gas or vapors, or electrons freed from the electrode film E by photo electric effect, would be impelled toward electrode C due to the electric field. There the electrons and ions would cause luminescence of the screen F by impart, having acquired energy by acceleration in the electric field. With a suitable ionizing gas some illumination may be produced in the gas itself, the higher frequency portions of which would also cause the film F to fluoresce. That portion of the total radiation, which is radiated or reflected forward, would proceed through the transparent or translucent areas in the electrode C as useful illumination. The portion of the light which is radiated backward is either reflected forward by diffuse or regular reflection at the film E whence it proceeds forward as useful illumination, or else a part of its energy is used up in producing free electrons out of E by the photo-electric effect.

Since the photo-electric effect is greatest for the ultra violet rays, and since in fluorescent effects light is usually reradiated at lower frequencies, then by a proper selection of materials the ultra violet portions of the gas spectrum will be automatically changed to yellower light where their luminous efficiency is greatly increased. Also by a proper selection and blending of fluorescent and luminescent materials in film F (materials may be in finely powdered form intimately intermixed in solid solution, as compounds, or even in special cases as a liquid or gel between double electrodes plates, etc.) very effective and beautiful results may be achieved.

With A. C. voltage supply the phosphorescent properties of the film F could be adjusted to act as an "optical ballast." By phosphorescent prolongation of radiation it would maintain a supply of electrons at film E during the reverse half of the cycle as well as a partial continuation of the light. It may be possible in this manner to reduce the objectionable flicker of light with A. C. supply much the same as thermal storage accomplishes the same result in filament lamps.

If the lamp is designed so that most or all of the electrons or ions are produced in the gas space between electrodes the film E may be made partly or entirely luminescent and deposited on a reflecting film D. Then both films E and F would produce light in a similar manner by bombardment of electrons and ions freed in the intermediate gas.

When operating as a responsive or amplifying device the action would be about as follows: The incident or exciting beam of light (which should be rich in light of frequencies higher than the minimum required to stimulate the photo-electric effect) will penetrate the electrical net C and the fluorescent, luminescent film F and impinge on the film E. Part of the incident light beam will be reflected at E and returned as useful illumination. Part will stimulate the film E photo-electrically and set free electrons which will be accelerated by the electric field between electrodes and cause luminescence of film F by electron impact. Part of the resulting luminescent light from the film F will be radiated forward as useful illumination. The remainder will be radiated backward to film E where it will be reflected forward to contribute to the useful illumination or where it will itself augment the photo-electric supply of electrons. Thus by a proper selection of voltage and materials for the active films E and F and a suitable gas G and pressure the characteristics of the lamp may be suited to its specific application.

Figure 5:
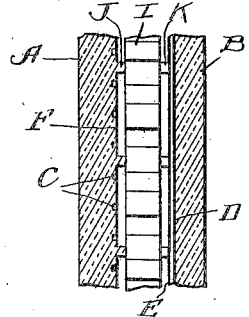
Fig. 5 is a fragmentary section of a modified form of lamp or screen particularly useful as a light relay or projecting screen.
Figure 6:
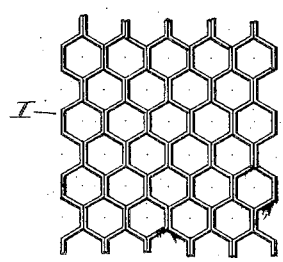
Fig. 6 is a side view of the light filter or barrier employed in Fig. 5.

If the lamp or "responsive screen" is so designed that the mutual interaction of the active films E and F is cumulative and it is also desired that a sharp image of the incident or exciting beam be retained then the separation of the electrodes or distance between plates should be made as small as possible compared to the sharpness or definition of the image desired in order to reduce the blurring resulting from radiation non-perpendicular to the plates. The electron and optical activity can also be confined to small elements by the insertion between the plates of a honeycomb of optical barriers of appropriate area and shape. Since the plates would have to be supported apart against atmospheric pressure anyhow if they are of any considerable area, and these supports would otherwise probably take the form of small insulating posts cemented at intervals to one or both plates, then such a set of barrier cells could be designed to give both this mechanical support and optical isolation and yet not be completely gas tight. The entire surface lamp or responsive screen could then be constructed and operated mechanically and electrically as one simple unit and yet contain numerous optically separate cells which could function independently of one another. For example, as shown in Figs. 5 and 6, such a honeycomb or cellular barrier or filter I may be constructed of plates set edgewise and formed and assembled as to produce a barrier to lateral dispersion. Such a barrier I may be made of thin plates of metal suitably spaced and supported between plates A and B by posts or projections J and K on the plates A and B, or it may be made of an insulating material in which case posts J and K can be dispensed with.

It is within my invention to employ this cellular structure if made of metallic plates as a substitute for the electrode structure C or it may be employed at a suitable potential to accelerate the electronic bombardment of the luminescent layer F.

If the lamp is operated with a cumulative characteristic and a response is desired proportional to the incident beam and in other special technical applications, the voltage applied to the electrodes C, D, may be interrupted or reversed at high frequency.

With modifications the device can be made to respond to a beam of electrons or ions projected onto it. In this case the "beam" would either first excite the luminescent film E and then produce amplification of the light in a manner already described, or else the charged particles would penetrate a porous electrode C, F, and cause activity between and on the films E, F. In such cases plate A would be rendered luminescent or else omitted.

Figure 1:
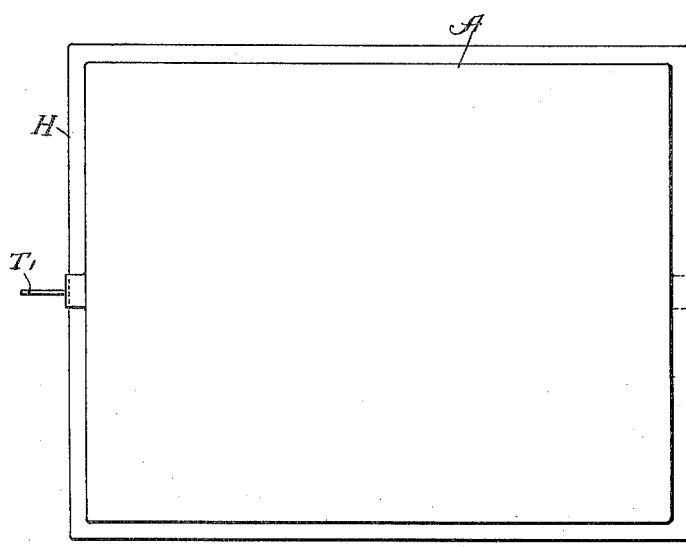
Fig. 1 is a front elevation of a lamp or screen of my invention.
Figure 2:
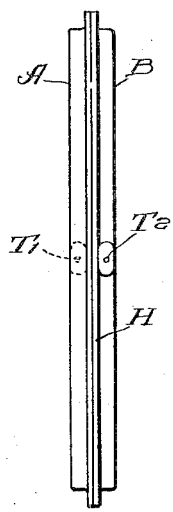
Fig. 2 is an end elevation of the same.

When used either as a primary source of light or as a responsive screen it is obvious that both plates could be made similar to assembly A, C, F, or its equivalent and combine the functions of films E and F. (Such an arrangement for example would be of advantage with A, C, voltage supply. While one plate is being bombarded by electrons the other plate would be bombarded by positive ions and optical effects could be produced accordingly. During a succeeding half cycle the action at the plates would be reversed.) With such a double arrangement light could be radiated from both surfaces, or the device could be excited with light or charged particles on one side and radiate light on one or both sides. This invention contemplates such variations in addition to the simpler form illustrated in Fig. 1 and Fig. 3.

Furthermore, although it is usually of mechanical or structural advantage to superimpose active electrodes or film elements C, F, and D, E, as shown, this invention contemplates constructions in which these elements may be separately constructed or mounted, or rearranged. The essential idea involved is a construction in which the electrodes are of large area compared with their separation and in which radiant energy is emitted through one or more transparent electrodes.

It is to be observed that if the space between the plates is small, a higher gas pressure may be used. It appears that for a given voltage, a certain volume of gas is needed, and, hence, for smaller spacing the required volume of gas is secured by raising the pressure. My device provides, in one aspect of its operation, a continuous and automatic interaction between radiant energy and electron emission, each causing the production of the other, the surplus light being radiated as useful illumination and the energy being supplied by an electric current.

I claim:—

1. A device of the class described comprising a film, and a pair of electrodes of relatively large area and relatively close spacing disposed upon opposite sides of the film for projecting an electronic bombardment against said film to render the same luminescent.

2. In a device of the class described, the combination of an evacuated vessel of relatively large area as compared to its thickness, comprising a pair of substantially parallel electrodes substantially co-extensive with the inside walls of the vessel, and a film of fluorescent material on one of said inside walls, said film being rendered luminescent by electronic bombardment maintained by said electrodes.

3. In combination, a pair of electrodes, a film of luminescent material adjacent one of said electrodes and substantially co-extensive therewith, a film of photo-sensitive material adjacent the other electrode and substantially co-extensive therewith.

4. In combination, a pair of electrodes, a film of luminescent material adjacent one of said electrodes and substantially co-extensive therewith, a film of photo-sensitive material adjacent the other electrode and substantially co-extensive therewith, and an ionizable gas in contact with said films.

5. The method of generating cold light which comprises, directing an electron stream against a luminescent surface to render the same active to give off light, projecting a portion of said light upon a photoelectric surface to free electrons which react upon the luminescent surface.

6. The method of transforming light of higher frequency into light of lower frequency which comprises, projecting the light of higher frequency upon a photoelectric surface to free electrons, and by said electron emission ionizing a gas to render the same luminescent at a lower frequency, and simultaneously exciting, by the electron emission and by the ionization of the gas, a luminescent screen.

7. The method of transforming light of higher frequency into light of lower frequency which comprises, projecting the light of higher frequency upon a photoelectric surface to free electrons, and by said electron emission ionizing a gas to render the same luminescent at a lower frequency, and simultaneously exciting, by the electron emission and by the ionization of the gas, a luminescent screen and projecting light from said screen back upon the photoelectric surface.

8. The method of amplifying light which comprises projecting a beam of light upon a photo-sensitive surface to free electrons, accelerating said electrons by a potential, and causing said electrons to impinge upon a luminescent material to release light.

9. The method of amplifying light which comprises projecting a beam of light upon a fluorescent screen and releasing light of another wave length from the screen, said latter light being projected on a photosensitive surface to free electrons, and projecting said electrons upon the initial fluorescent screen.

10. The method of amplifying light which comprises projecting a beam of light upon a fluorescent screen and releasing light of another wave length from the screen, said latter light being projected on a photosensitive surface to free electrons, and projecting said electrons upon the initial fluorescent screen, and accelerating said electron flow by a potential.

11. In combination, a pair of electrodes, a photosensitive screen of electron releasing material adjacent one of said electrodes, and a screen adjacent the other electrode, which is luminescent when exposed to electron bombardment, the electro-static field between said electrodes accelerating electrons released from the first screen and projecting them against the other, said luminescent screen projecting radiant energy back upon the first screen.

12. An electrode having electrical conductivity and being transparent to light and fluorescent under the action of light.

13. A transparent electrode comprising a transparent plate having a metal grid deposited thereupon.

14. A device of the class described comprising a pair of electrodes of relatively large area and close spacing, one of said electrodes being reticulated to provide openings, a film of luminescent material disposed in the openings of said one electrode and being substantially co-extensive therewith, and a gas at low pressure in contact with said electrodes and said film.

15. In combination, a pair of electrodes, an ionizable gas between said electrodes, a film of luminescent material capable of giving off light under the excitation of electronic bombardment, and a photo-electrically sensitive material capable of emitting electrons under the action of light.

16. The method of transforming light of one frequency into light of another frequency which comprises projecting the light of one frequency upon a photo-electric surface to free electrons, and projecting said electrons against a luminescent surface to render the same luminescent at a different frequency.

17. In combination, a pair of plate like electrodes of relatively large area and close spacing and a cellular or honeycomb structure separating said electrodes, said barrier providing mechanical support between the plate-like electrodes and at the same time dividing the region between the electrodes into a plurality of optically and electrically isolated cells.

18. A transparent electrode consisting of a metal grid having its openings made electrically continuous by a transparent film of metal.

In witness whereof, I hereunto subscribe my name this 19th day of July, 1927.

KENNETH W. MILLER.